(12) United States Patent
Keller

(10) Patent No.: US 6,292,467 B1
(45) Date of Patent: Sep. 18, 2001

(54) APPARATUS AND METHOD OF DETERMINING A LINK STATUS BETWEEN NETWORK STATIONS CONNECTED TO A TELEPHONE LINE MEDIUM

(75) Inventor: Philip J. Keller, Fremont, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/100,026

(22) Filed: Jun. 19, 1998

(51) Int. Cl.[7] ............................................. G01R 31/08
(52) U.S. Cl. ................................ 370/241; 370/445
(58) Field of Search ................................. 370/241, 242, 370/245, 248, 250, 252, 254, 257, 445, 449, 458

(56) References Cited

U.S. PATENT DOCUMENTS 5,754,552 * 5/1998 Allmond et al. ..................... 370/465
5,923,663 * 7/1999 Bontemps et al. ................... 370/445

FOREIGN PATENT DOCUMENTS 0 573 204   12/1993  (EP) .
0 656 711    6/1995  (EP) .

* cited by examiner

Primary Examiner—David R. Vincent

(57) ABSTRACT

A local area network having a telephone line medium in a home network environment includes physical layer transceivers having transmit and receive state machines enabling each network station to determine a link status on the telephone line medium. The transmit state machine is configured for transmitting a link packet within a prescribed interval (T), less than a minimum packet length of a data packet, and having a preamble and a sufficient number of bytes to allow for transmission. Hence, the link packet will be detected by the other stations on the network, but will not be processed, since it is classified as a runt packet by the media access control layers. The receive state machine monitors the telephone line medium, and if after a prescribed interval (2T) the station has not detected a valid preamble from a data packet or a link packet, then the link status indicator for that station is set to an invalid condition, and subsequently supplied to the station operating system.

20 Claims, 3 Drawing Sheets

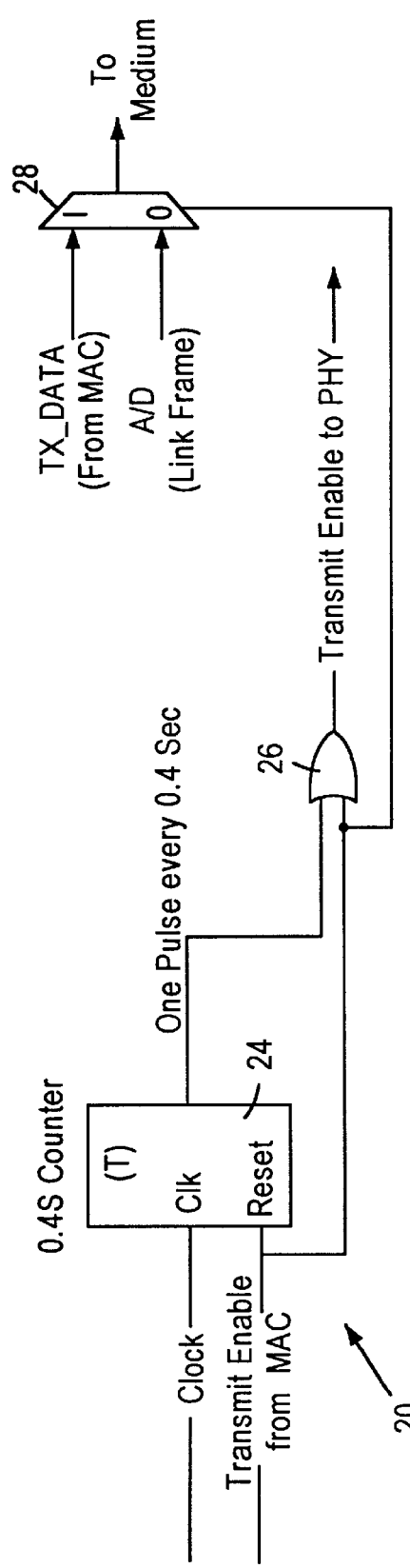
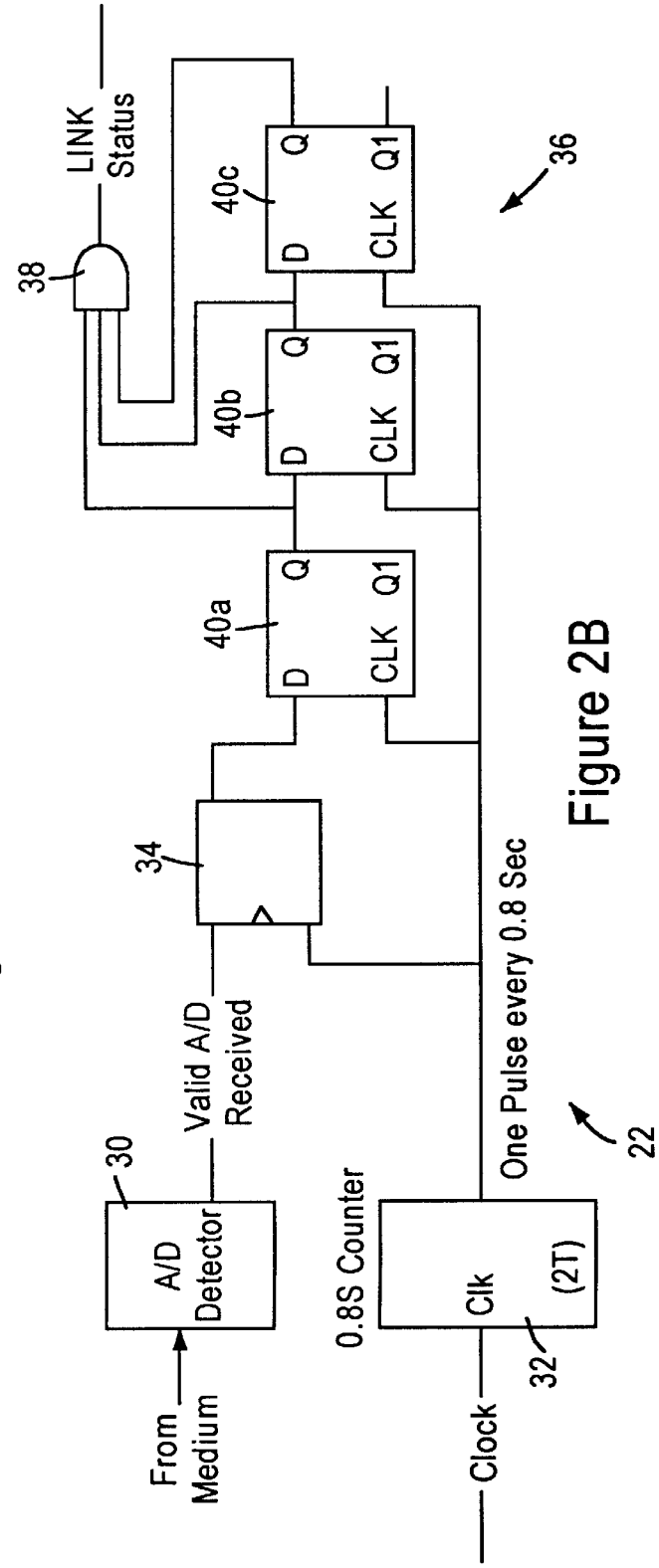
Figure 2A
Figure 2B

APPARATUS AND METHOD OF DETERMINING A LINK STATUS BETWEEN NETWORK STATIONS CONNECTED TO A TELEPHONE LINE MEDIUM

BACKGROUND OF THE INVENTION

1. Field of the Invention

The present invention relates to network interfacing, and more particularly, to methods and systems for detecting a link status between network stations connected to a telephone line medium.

2. Description of the Related Art

Local area networks use a network, cable or other media to link stations on the network. Each local area network architecture uses a media access control (MAC) enabling network interface cards at each station to share access to the media.

Conventional local area network architectures use media access controllers operating according to half-duplex or full-duplex Ethernet (ANSI/IEEE standard 802.3) protocol using a prescribed network medium, such as 10 BASE-T. Newer operating systems require that a network station be able to detect the presence of the network. In an Ethernet 10 BASE-T environment, the network is detected by the transmission of a link pulse by the physical layer (PHY) transceiver. The periodic link pulse on the 10 BASE-T media is detected by a PHY receiver, which determines the presence of another network station transmitting on the network medium based on detection of the periodic link pulses. Hence, a PHY transceiver at Station A is able to detect the presence of Station B, without the transmission or reception of data packets, by the reception of link pulses on the 10 BASE-T medium from the PHY transmitter at Station B.

Efforts are underway to develop an architecture that enables computers to be linked together using conventional twisted pair telephone lines instead of established local area network media such as 10 BASE-T. Such an arrangement, referred to herein as a home network environment, provides the advantage that existing telephone wiring in a home may be used to implement a home network environment. However, telephone lines are inherently noisy due to spurious noise caused by electrical devices in the home, for example dimmer switches, transformers of home appliances, etc. In addition, the twisted pair telephone lines suffer from turn-on transients due to on-hook and off-hook and noise pulses from the standard POTS telephones, and electrical systems such as heating and air conditioning systems, etc. Hence, the 10 BASE-T technique of sending link pulse cannot be used in a home networking environment, since the link pulses cannot be distinguished from noise signals inherently present in home networking environments.

SUMMARY OF THE INVENTION

There is a need for an arrangement for a network station to reliably detect the presence of other stations on the network, or the failure on the network, when the network includes a telephone line medium.

There is also a need for an arrangement for a network node to determine the presence of another network node on a medium susceptible to noise, without the necessity of transmitting a data packet that may otherwise reduce network throughput.

There is also a need for an arrangement in a network station to determine the presence of another network node on a medium susceptible to noise, while minimizing any reduction in system resources in a network station.

These and other needs are attained by the present invention, where a physical layer transceiver in a network having a telephone line medium determines the presence of another network station connected to a telephone line medium by determining the presence of a transmitted frame on the telephone line medium within a prescribed interval.

According to one aspect of the present invention, a method in a first network station enables detection of a link status with a second network station connected to a telephone line medium. The method includes determining a presence of a frame on the telephone line medium from the second network station within a prescribed interval. The method also includes setting the link status to an invalid state based on the determined absence of the frame within the prescribed interval. The detection of a transmitted frame on the telephone line medium enables the first network station to determine the link status based on the reception of the transmitted frame within a prescribed interval. If the frame is not detected within the prescribed interval, then the first network station sets the link status to an invalid state. In addition, the transmitted frame may be either a data frame, or a link frame having a length less than the minimum frame length. Use of a link frame having a length less than a minimum data frame length enables a physical layer transceiver to process the received link frame as if it was a data frame, by sending the link frame to the media access controller. Since the link frame is less than the minimum data frame length, the media access controller will discard the link frame as a runt frame, without wasting system resources in the receiving network station. Hence, a network station may reliably determine a link status with minimal disruption in network throughput, and while avoiding disruption of system resources in a network station.

Another aspect of the present invention provides a method in a network having a first network station, a second network station, and a telephone line medium for communication between the first and second network stations. The method includes transmitting by the first network station a link frame, having a length less than a minimum length of a data frame, onto the telephone line medium a first prescribed interval following transmission of the data frame by the first network station. The method also includes, in the second network station, determining a presence of the transmitted link frame on the telephone line medium within a second prescribed interval, and setting the link status to an invalid state based on the determined absence of the link frame within the second prescribed interval. The transmission of the link frame by the first network station having a length less than a minimum length of data frame enables the physical layer transceivers of other network stations to detect the link frame and thereby determine the presence of other stations on the network. Use of a link frame having a length less than the minimum data frame length also ensures that the link frame will not be processed by the other network stations, since the link frame will be classified as a runt packet and thereby discarded. Transmission of the link frame within a first prescribed interval following transmission of the data frame by the first network station also ensures that the link frame is transmitted during idle intervals, enabling the network stations to determine the link integrity without affecting network throughput.

Still another aspect of the present invention provides a network for transmission of data, the network comprising a telephone line medium, and network stations configured for sending and receiving a link frame and a data frame on the telephone line medium. Each network station includes a transmitter configured for outputting one of a data frame and a link frame, having a length less than a minimum data frame length, onto the telephone line within a first prescribed interval following transmission of a transmitted data frame, and a receiver configured for determining a link status of the telephone line medium based on detection of a frame transmitted from another one of the network stations within a second prescribed interval.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIGS. 2A and 2B are diagrams illustrating a physical layer transmitter and a physical layer receiver for sending and receiving a link frame from the telephone line medium respectively.

BEST MODE FOR CARRYING OUT INVENTION

Figure 1:
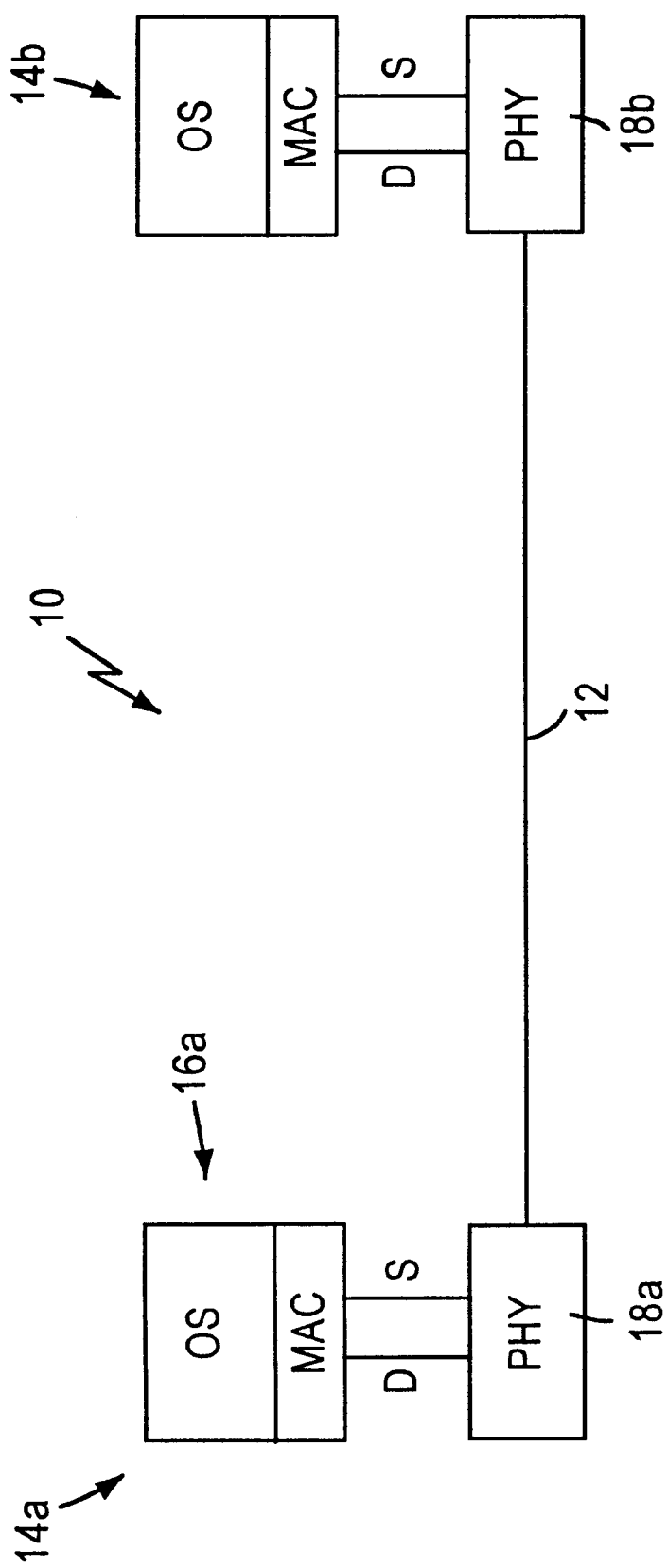
FIG. 1 is a diagram illustrating a network for transmission of data using a telephone line medium according to an embodiment of the present invention.

FIG. 1 is a block diagram of a network 10 for transmission of data in a home networking environment according to an embodiment of the present invention.

The network 10 includes a telephone line medium 12, specifically a twisted pair medium, and network stations 14 configured for sending and receiving a link packet and a data packet on the telephone line medium 12, described below. The telephone line medium 12 includes a plurality of branch connections (not shown) to interconnect telephones, facsimile machines, etc., to a telephone network interface, for connection to a public switched telephone network. The term "home networking environment," however, refers to use of the twisted pair medium 12 within a subscriber premises. Hence, the network 10 operates independently from telephony-related services provided by the public switched telephone network.

As shown in FIG. 1, each network station 14, for example a personal computer or intelligent consumer electronics device, includes an operating system (OS) and media access control (MAC) portion 16 for sending and receiving data packets onto the network 10.

Each network station 14 also includes a physical layer transceiver 18 for transmitting the data packet from the corresponding media access controller (MAC) onto the telephone line medium 12, and for supplying a data frame (i.e., data packet) from the telephone line medium 12 to the MAC as receive data. Transmit and receive data is transferred between the MAC portion 16 and the PHY 18 via data paths (D).

Use of telephone lines as the transmission medium results in a substantial amount of noise on the network medium 12. Hence, it is necessary to be able to reliably detect the presence of other stations on the network, or the failure of the network. Such information is supplied from the PHY 18 to the operating system 16 using status signals (S).

According to the disclosed embodiment, each physical layer transceiver 18 includes two independent state machines, one for controlling the transmission of link packets onto the network medium 12, and the second for detecting the presence of receive activity from the telephone network medium 12.

FIG. 2A is a block diagram illustrating a transmit state machine 20 in each physical layer transceiver 18 for controlling the transmission of a link packet. FIG. 2B is a diagram illustrating a state machine 22 in each physical layer transceiver 18 for detecting the presence of a packet on the network medium 12. According to the disclosed embodiment, the transmit state machine 20 generates a link packet having a length less than a minimum frame length of a valid data packet. For example, a data packet according to Standard IEEE 802.3 has a minimum packet length of 64 bytes. The link packet has a proper formatting in the preamble phase, enabling the receive state machine 22 in the receiving physical layer transceiver 18 to detect the beginning of a valid packet. The link packet also has a number of data bytes following the preamble phase to enable the receive state machine 22 to transition into data mode.

As shown in FIG. 2A, the transmit state machine 20 includes a counter 24, an OR gate 26, and a multiplexer 28. The transmit state machine 20 is configured for outputting a link frame, in particular an access identifier (AID) onto the telephone line 12, if a data packet is not transmitted from the MAC within a first prescribed interval following transmission of a transmitted data packet. Specifically, the counter 24 is reset in response to receiving a transmit enable signal from the corresponding MAC 16, indicating transmission of valid data by the MAC. The transmit enable signal is also passed through the OR gate 26 to multiplexer 28, which selects the transmit data (TX_DATA) from the MAC 28 for transmission onto the medium 12. Although not shown in FIG. 2A, it will be recognized that the output of multiplexer 28 will be supplied to additional encoders and digital to analog converters for generating an analog signal for transmission on the telephone line medium 12.

Following the deassertion of the transmit enable signal from the MAC 16 indicating the end of a transmission of a data packet, assuming the counter 24 is not reset by the transmission of another data packet from the MAC 16, the counter 24 outputs a pulse every prescribed interval (T), for example 0.4 seconds, which is supplied to an inverting input of the OR gate 26. Hence, the OR gate 26 causes the multiplexer 28 to output a link frame onto the telephone line 12 a first prescribed interval (T) following transmission of the data packet. Hence, if after time (T) the network station has not initiated transmission of a normal data frame, then the transmit state machine 20 will initiate transmission of a link frame onto the network medium 12.

FIG. 2B is a diagram of the receive state machine 22. As shown in FIG. 2B, the receive state machine 22 in each physical layer transceiver 18 is configured for determining a presence of the transmitted frame on the telephone line medium 12 within a second prescribed interval (2T), and setting a link status to an invalid state based on the determined absence of the transmitted frame within the second prescribed interval (2T). Specifically, the receive state machine 22 includes a preamble detector 30 for detecting an access ID (AID) from another network station as the preamble for transmission of a data frame. According to the disclosed embodiment, the AID replaces the preamble conventionally used in 10 BASE-T Ethernet (IEEE 802.3) system.

In particular, AID is a specific identifier which is unique for each network station 14. AID is a series of eight pulses output from the PHY transceiver 18 onto the telephone medium 12, where the time intervals between the first pulse and the successive seven pulses define respective values. For example, assume a second pulse is output by the PHY transceiver 18 following a first pulse at time T1. If T1 equals 66 clock cycles (assuming a 116 nanosecond clock), the corresponding value is 00; if T1 equals 86, 106, or 126 clock cycles, the values are 01, 10, or 11, respectively, where the maximum interval between pulses is 128 clock cycles. The same arrangement is used to detect the values in time intervals T2, T3, T4, T5, T6, and T7. Hence, the presence of a valid AID can be detected by detecting a first pulse, and then detecting a presence of seven successive pulses using detection windows each having a duration of 128 clock cycles. As described below, a detector 30 determines the presence of a valid AID by detecting a pulse within each successive 128 clock cycle window for eight successive windows. As such, the actual value of the AID is not as important for link detection as the detection of a valid AID.

According to the disclosed embodiment, the receive state machine 22 monitors for a second prescribed interval (2T) the presence of another station's AID based on the expectation that the transmit state machine 20 transmits an AID as a link packet, or a preamble of a data packet, within an interval (T). If after a second prescribed interval (2T), the receive state machine 22 has not detected a valid preamble from the AID detector 30, then the link status indicator is set to an invalid condition. The valid preamble detected by the AID detector 30 may be the result of a normal data packet or a link packet having a length less than the minimum length of the data frame.

As shown in FIG. 2B, the receive state machine 22 also includes a counter 32 for counting the prescribed interval (2T), for example 0.8 seconds. The receive state machine 22 also includes a latch 34, an event counter 36, and logic (e.g., an AND gate) 38 configured for setting the link status to an invalid state based on the determined absence of the frame (e.g., link frame or data frame) within the second prescribed interval 2T.

As shown in FIG. 2B the latch 34 is set in response to detection of a valid AID during each prescribed interval 2T. In particular, the AID detector 30 outputs a detect signal to the latch 34 in response to detecting an access identifier on the telephone line medium from another network station. As described above, the AID may be from a link frame, or the preamble of a data frame. The latch 34 outputs the latched detect signal to the event counter 36, which includes a plurality of delay flip flops 40, used to count a successive number of the prescribed intervals 2T having detected the corresponding link frame based on the detect signal. As shown in FIG. 2B, the delay flip flops output a corresponding signal to the logic AND gate 38, such that the logic sets the link status to a valid state in response to the successive counting of successively received valid AID signals. Hence, if during the prescribed interval 2T a valid frame header (e.g., valid AID) is detected, the event counter 36 is incremented; if no valid frame header is received during the prescribed interval 2T, the event counter 36 is cleared.

Figure 3:
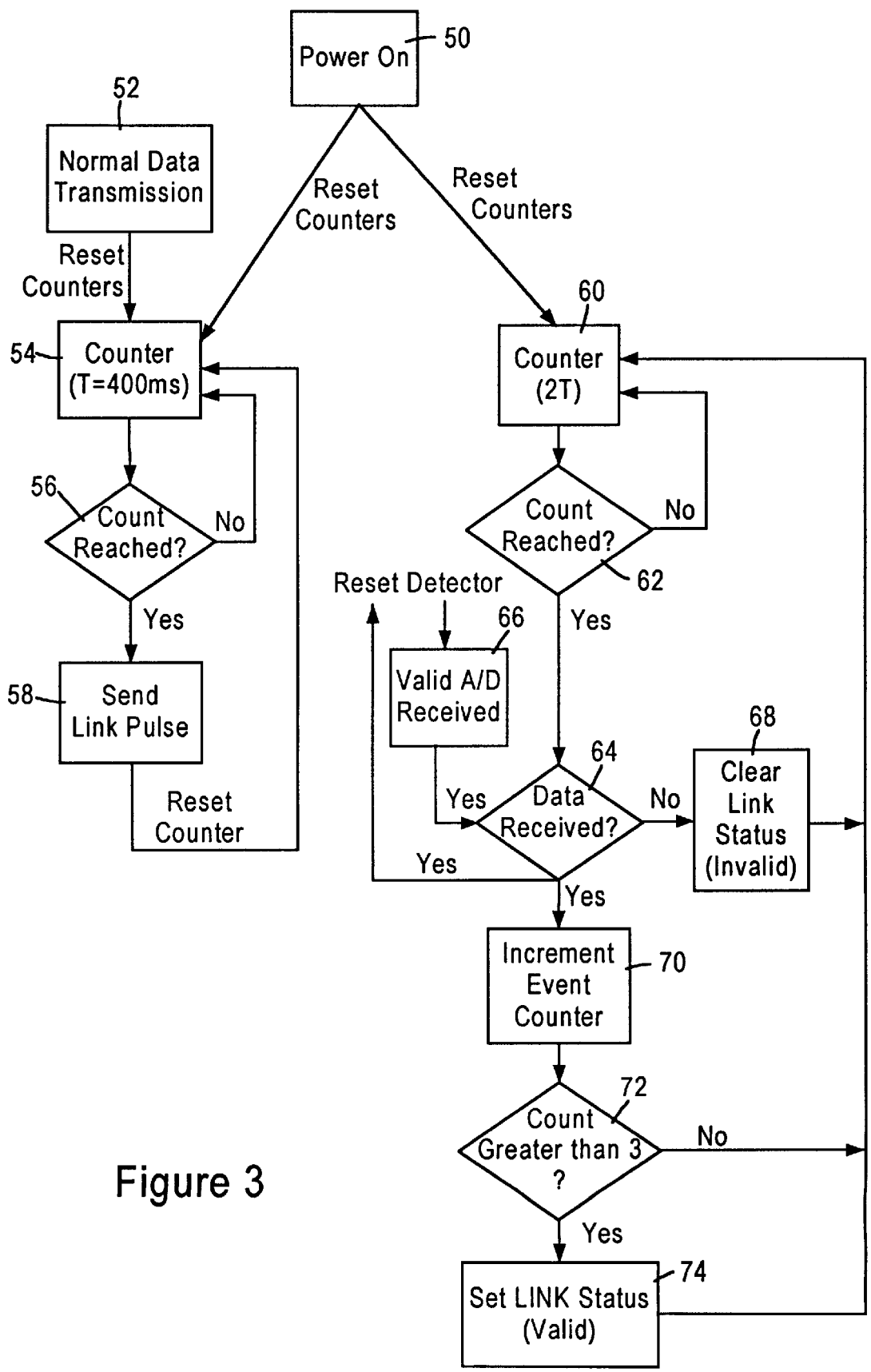
FIG. 3 is a flow diagram summarizing the method of transmitting and receiving link packets according to an embodiment of the present invention.

FIG. 3 is a flow diagram illustrating operation of the transmit state machine 20 and the receive state machine 22 in the physical layer transceiver 18 according to an embodiment of the present invention. As shown in FIG. 3, the transmit state machine 20 operates either from an initial power on state 50 or normal data transmission (step 52), during which time the counter 24 is reset by assertion of the transmit enable signal from the MAC. Following reset of the counter 24, the counter 24 counts up to a prescribed interval (T), for example 400 milliseconds in step 54, unless reset by another data transmission in step 52. If in step 56 the count is reached, then the link frame is sent in step 58. Hence, the counter 24 is reset either based on a power on/reset condition, normal data transmission in step 52, or the transmission of a link pulse is step 58.

The receive state machine 22 is initialized by resetting of the counter 32 in step 60. The counter 32 counts in response to receiving an internal clock signal, for example a local oscillator signal. If in step 62 the count reaches the prescribed interval of 2T, for example 800 milliseconds, the state machine 22 checks in step 64 if a valid AID has been received in step 66 by the AID detector 30. As described above, the AID may be transmitted as a link packet or as a preamble for a data packet. If no valid AID has been received within the second prescribed interval of 2T, then the link status is cleared, i e., set to an invalid state based on the determined absence of the link frame within the prescribed interval in step 68, for example, by outputting a zero from the delay flip flop 40a to the AND gate 38. However, if a valid AID is received, then the event counter 36 is incremented in step 70. As shown in FIG. 2B, the event counter 36 is incremented by successively outputting the latched signal to the cascaded delay flip flops 40. If the event counter 36 reaches a prescribed value in step 72, for example, three, then the link status is set in step 74 to a valid status, indicating that link packets (e.g. AID packets) have been reliably received from the telephone medium 12.

According to the disclosed embodiment, a physical layer transceiver includes a transmit state machine and receive state machine for reliably detecting the presence of other stations on the network. The receive state machine 22, assuming that the received packet is a data packet, forwards the link packet to the media access controller 16. However, the media access controller 16 will discard the received packet if it is a link packet, since the received packet is less than the minimum required frame size. Hence, the reliability of the link on the telephone line 12 can be reliably determined without expending any system resources in the operating system 16.

While this invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A method in a first network station of detecting a link status with a second network station connected to a telephone line medium, the method comprising:
   determining a presence of a frame on the telephone line medium from the second network station within a prescribed interval; and
   setting the link status to an invalid state based on the determined absence of the frame within the prescribed interval.

2. The method of claim 1, wherein the determining step comprises detecting the presence of a valid access identifier as a link frame, having a length less than a minimum data frame length, within the prescribed interval.

3. The method of claim 2, wherein the determining step further comprises:
   incrementing an event counter in response to the detected presence of the valid access identifier during the prescribed interval; and
   resetting the event counter in response to the determined absence of the valid access identifier during the prescribed interval.

4. The method of claim 3, further comprising setting the link status to a valid state in response to the event counter reaching a prescribed value during a prescribed number of successive intervals.

5. The method of claim 4, wherein the prescribed interval has a duration of about eight hundred milliseconds.

6. The method of claim 4, wherein the prescribed number of successive intervals equals at least three.

7. The method of claim 1, further comprising outputting the link status from a physical layer transceiver in the first network station to a media access controller in the first network station.

8. A method in a network having a first network station, a second network station, and a telephone line medium for communication between the first and second network stations, the method comprising:
   transmitting by the first network station a link frame, having a length less than a minimum length of a data frame, onto the telephone line medium a first prescribed interval following transmission of the data frame by the first network station; and
   in the second network station:
      (1) determining a presence of the transmitted link frame on the telephone line medium within a second prescribed interval, and
      (2) setting the link status to an invalid state based on the determined absence of the link frame within the second prescribed interval.

9. The method of claim 8, wherein the transmitting step comprises:
   resetting a counter in response to a transmit enable signal received from a media access controller, and
   outputting from the counter a transmit enable signal in response to counting the first prescribed interval in response to the resetting step.

10. The method of claim 9, wherein the transmitting step further comprises selectively outputting from one of a media access controller data path and a link packet path, onto the telephone line medium, based on the transmit enable signal.

11. The method of claim 10, wherein the transmitting step further comprises outputting an access identifier as said link packet from the link packet path.

12. The method of claim 8, wherein the determining step further comprises:
   incrementing an event counter in response to the detected presence of the valid access identifier during the prescribed interval; and
   resetting the event counter in response to the determined absence of the valid access identifier during the prescribed interval.

13. The method of claim 12, further comprising setting the link status to a valid state in response to the event counter reaching a prescribed value during a prescribed number of successive intervals.

14. The method of claim 13, wherein the prescribed interval has a duration of about eight hundred milliseconds.

15. The method of claim 13, wherein the prescribed number of successive intervals equals at least three.

16. The method of claim 8, further comprising outputting the link status from a physical layer transceiver in the first network station to a media access controller in the first network station.

17. A network for transmission of data, the network comprising:
   a telephone line medium; and
   network stations configured for sending and receiving a link frame and a data frame on the telephone line medium, each network station comprising:
      (1) a transmitter configured for outputting one of a data frame and a link frame, having a length less than a minimum data frame length, onto the telephone line within a first prescribed interval following transmission of a transmitted data frame, and
      (2) a receiver configured for determining a link status of the telephone line medium based on detection of a frame transmitted from another one of the network stations within a second prescribed interval.

18. The network of claim 17, wherein the receiver includes logic configured for setting the link status to an invalid state based on the determined absence of the frame within the second prescribed interval.

19. The network of claim 18, wherein the receiver further includes:
   a detector configured for outputting a detect signal in response to detecting on the telephone line medium an access identifier as said link frame from said another one of the network stations; and
   an event counter configured for counting a successive number of the second prescribed intervals having detected the corresponding link frame based on the detect signal, the logic setting the link status to an invalid state in response to the successive number reaching a prescribed value.

20. The network of claim 19, wherein the event counter includes a plurality of delay flip flops corresponding to the prescribed value, each delay flip flop outputting a corresponding signal to the logic.

* * * * *